(12) United States Patent
Kashiwagi et al.

(10) Patent No.: US 7,201,412 B2
(45) Date of Patent: Apr. 10, 2007

(54) VEHICLE BUMPER

(75) Inventors: Masakazu Kashiwagi, Wako (JP); Hideki Minami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 11/191,860

(22) Filed: Jul. 28, 2005

(65) Prior Publication Data

US 2006/0028037 A1 Feb. 9, 2006

(30) Foreign Application Priority Data

Aug. 5, 2004 (JP) .............................. 2004-229714

(51) Int. Cl.
*B60R 19/22* (2006.01)
(52) U.S. Cl. ...................... 293/109; 293/121
(58) Field of Classification Search ................ 293/109, 293/120–122
See application file for complete search history.

(56) References Cited

U.S. PATENT DOCUMENTS 3,880,454 A * 4/1975 Haberle et al. ............. 293/121
6,485,072 B1 * 11/2002 Werner et al. .............. 293/132
6,637,788 B1 * 10/2003 Zollner et al. .............. 293/107
6,764,117 B2 * 7/2004 Jonsson ..................... 293/109
6,983,964 B2 * 1/2006 Murata et al. .............. 293/109

FOREIGN PATENT DOCUMENTS

| DE | 2 107 701 | | 9/1972 |
|---|---|---|---|
| DE | 2107701 | * | 9/1972 |
| DE | 43 41 884 A1 | | 6/1994 |
| DE | 101 12 424 A1 | | 9/2002 |
| DE | 601 07 570 T2 | | 12/2005 |
| EP | 1 454 799 A1 | | 9/2004 |
| JP | 11-208389 | | 8/1999 |
| JP | 2004-155313 | | 6/2004 |
| WO | 2004028863 | | 4/2004 |

* cited by examiner

*Primary Examiner*—Dennis H. Pedder
(74) *Attorney, Agent, or Firm*—Rankin, Hill, Porter & Clark LLP

(57) ABSTRACT

A vehicle bumper includes a bumper beam, a bumper face and an energy-absorbing member provided between the bumper beam and the bumper face. The energy-absorbing member has an L-shaped cross-section and includes a head of a front upper portion protruding upward. A space is formed between the bumper beam and the head. When a collision load acts on the bumper face, the head is deformed toward the space, thus absorbing the impact energy.

8 Claims, 8 Drawing Sheets

VEHICLE BUMPER

FIELD OF THE INVENTION

The present invention relates to vehicle bumpers for reducing the degree of injury to a pedestrian's leg.

BACKGROUND OF THE INVENTION

Vehicle bumpers in the related art including a bumper beam, a bumper face covering the front surface of the bumper beam, and an energy-absorbing member interposed therebetween, for reducing the degree of injury to a pedestrian's leg are proposed in Japanese Patent Laid-Open Publication Nos. 2004-155313 and HEI-11-208389, for example. The vehicle bumper in 2004-155313 will be described with reference to FIGS. 11A and 11B; the vehicle bumper in HEI-11-208389 will be described with reference to FIGS. 12A and 12B.

Figure 11A:
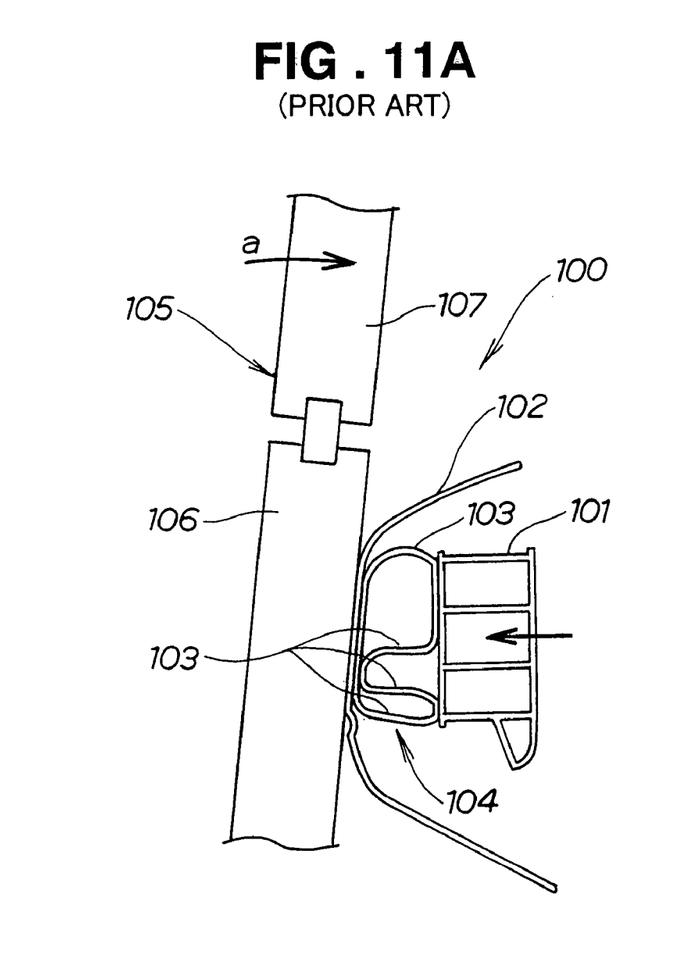
FIGS. 11A and 11B are diagrams illustrating a state of deformation of an energy-absorbing member when a load is applied to a vehicle bumper in the related art.

FIG. 11A shows a bumper structure 100 with an energy-absorbing member 104 including a plurality of support walls 103 interposed between a bumper beam 101 and a bumper face 102, in a state of collision with a pedestrian's leg 105.

Figure 11B:
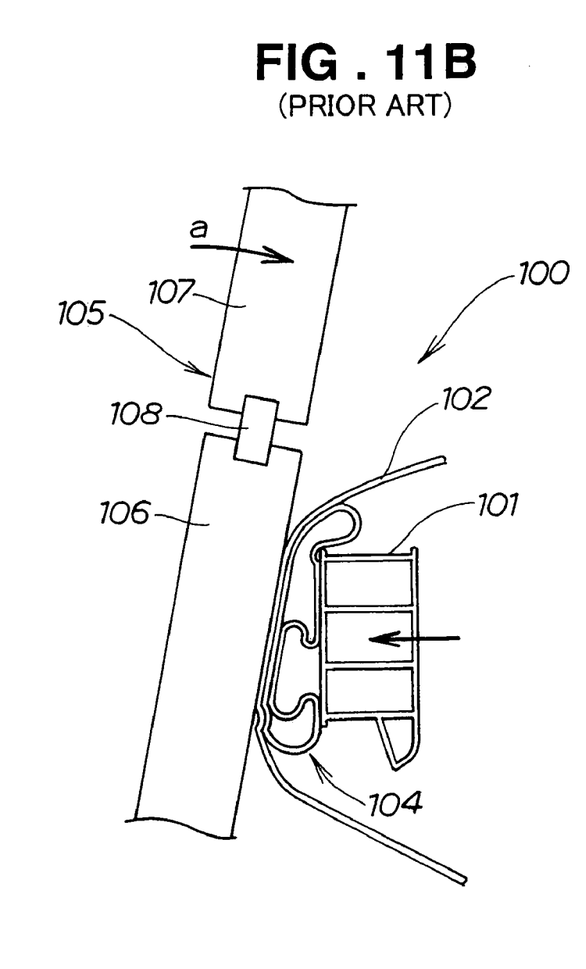

When the bumper face 102 strikes a portion 106 below the knee, a thigh 107 starts to incline in the direction of arrow a. As shown in FIG. 11B, the thigh 107 and the knee 108 are displaced toward the vehicle. At that time, the energy-absorbing member 104 is deformed more greatly at an upper portion thereof than at a lower portion. That is, the deformation according to the displacement of the parts of the leg 105 reduces the degree of injury to the leg 105.

The energy-absorbing member 104, however, has low energy-absorption performance because it consists of the support walls 103 and has a limited vertical length. To increase the energy-absorption performance, it is necessary to enlarge the energy-absorbing member 104, that is, to extend it vertically and longitudinally (from side to side in the figure). This will cause a new problem of adversely affecting the appearance of the vehicle and the engine cooling performance.

Figure 12A:
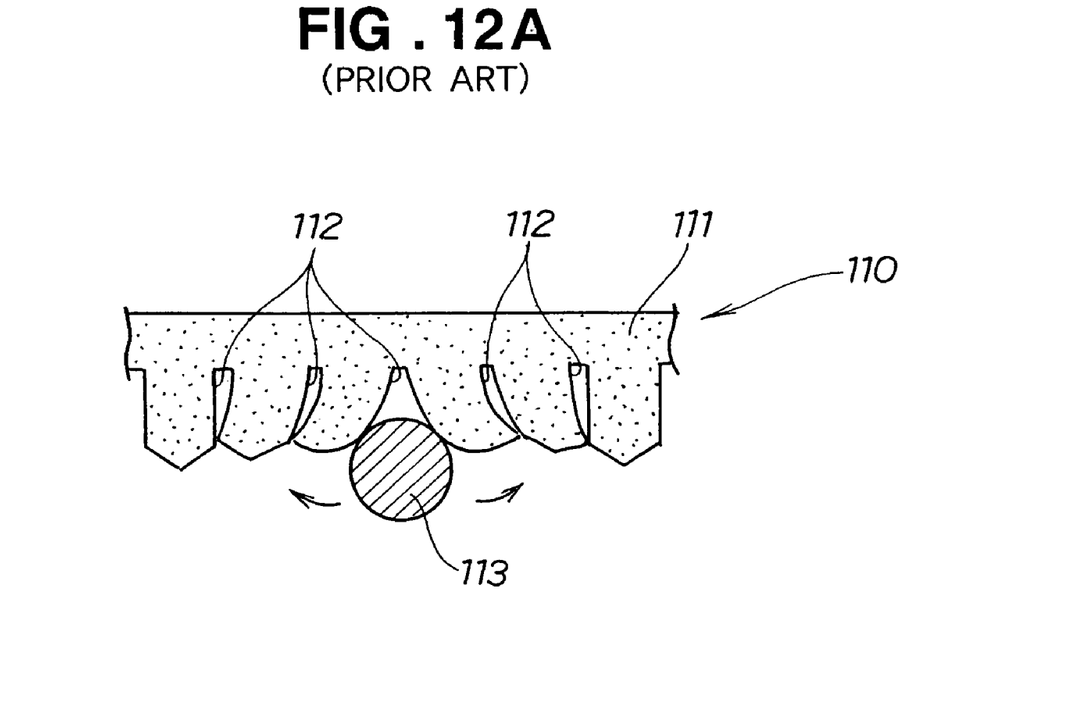
FIGS. 12A and 12B are diagrams illustrating a relationship between another energy-absorbing member in the related art and a leg.

An energy-absorbing member 110 shown in FIG. 12A consists of a lower block and an upper block. The upper block provided at the height of a leg consists of separate bodies 111. A plurality of slits 112 are formed between the separate bodies 111 in a vertical direction.

The provision of the slits 112 between the separate bodies 111 constituting the upper block allows the energy-absorbing member 110 to be made compact. However, absorbed energy differs greatly depending on the place of collision on the separate bodies 111.

The reason why absorbed energy differs depending on the place of collision will be described below.

Figure 12B:
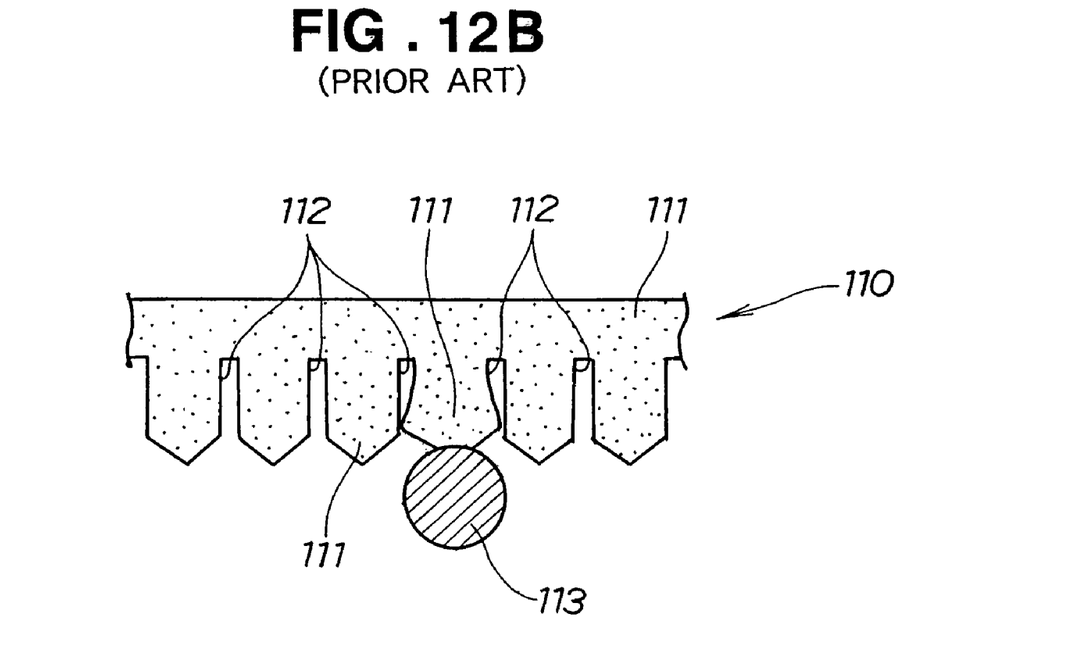

If a leg 113 collides with a separate body 111 as shown in FIG. 12B, the leg 113 does not come into any slit 112. Consequently, the separate body 111 is compressively deformed without flexibly deformed laterally. This prevents some portions from absorbing the load of the leg 113, making it impossible to sufficiently reduce the degree of injury to the leg 113, depending on the place of collision.

The bumper structure shown in FIGS. 12A and 12B varies in the amount of energy absorption depending on collision areas, and leaves room for improvement as a bumper structure intended for energy absorption. That is, there is demand for a vehicle bumper which is compact and can sufficiently reduce the degree of injury to a pedestrian's leg.

SUMMARY OF THE INVENTION

According to the present invention, there is provided a vehicle bumper which comprises: a bumper beam extending transversely of a vehicle; a bumper face covering a front surface of the bumper beam; and an energy-absorbing member interposed therebetween; wherein the bumper beam includes a flat vertical surface at least at the front surface; the energy-absorbing member is made from a foam material, and is an L-shaped cross-section member including a body extending from the vertical surface toward the bumper face, and a head extending from a front upper surface or a front lower surface of the body upward or downward; and a space is provided between the head of the energy-absorbing member and the front surface of the bumper beam.

The provision of the head extended from the front upper surface or the front lower surface of the body upward or downward can provide a load allowable for the protection of a leg in the initial stages of a collision.

The provision of the space between the head and the front surface of the bumper beam allows the energy-absorbing member to move to the space upon a collision. Therefore, a rapid increase in the load caused by the bumper face striking the bumper beam, which is called a bottom-hitting phenomenon, or by non-collapsing portions of the energy-absorbing member is unlikely to occur.

In addition, the provision of the space rearward of the head allows a sufficient impact-absorbing stroke of the bumper, providing favorable load characteristics.

Accordingly, throughout the head of the bumper, a load allowable for the protection of a leg in the initial stages of a collision can be obtained, and also favorable load characteristics can be obtained.

Preferably, the bumper beam is an aluminum extrusion, and is provided with mating holes in a midsection thereof in a transverse direction; and the energy-absorbing member is provided with protrusions to be fitted into the mating holes, and is provided at laterally opposite ends thereof upper and lower hooks to engage upper and lower flanges provided at the top and bottom of the front surface of the bumper beam. Thus, the protrusions of the energy-absorbing member can be fitted into the mating holes of the bumper beam, and the upper and lower hooks of the energy-absorbing member can be engaged with the upper and lower flanges of the bumper beam. Accordingly, the energy-absorbing member can be easily mounted to the bumper beam.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
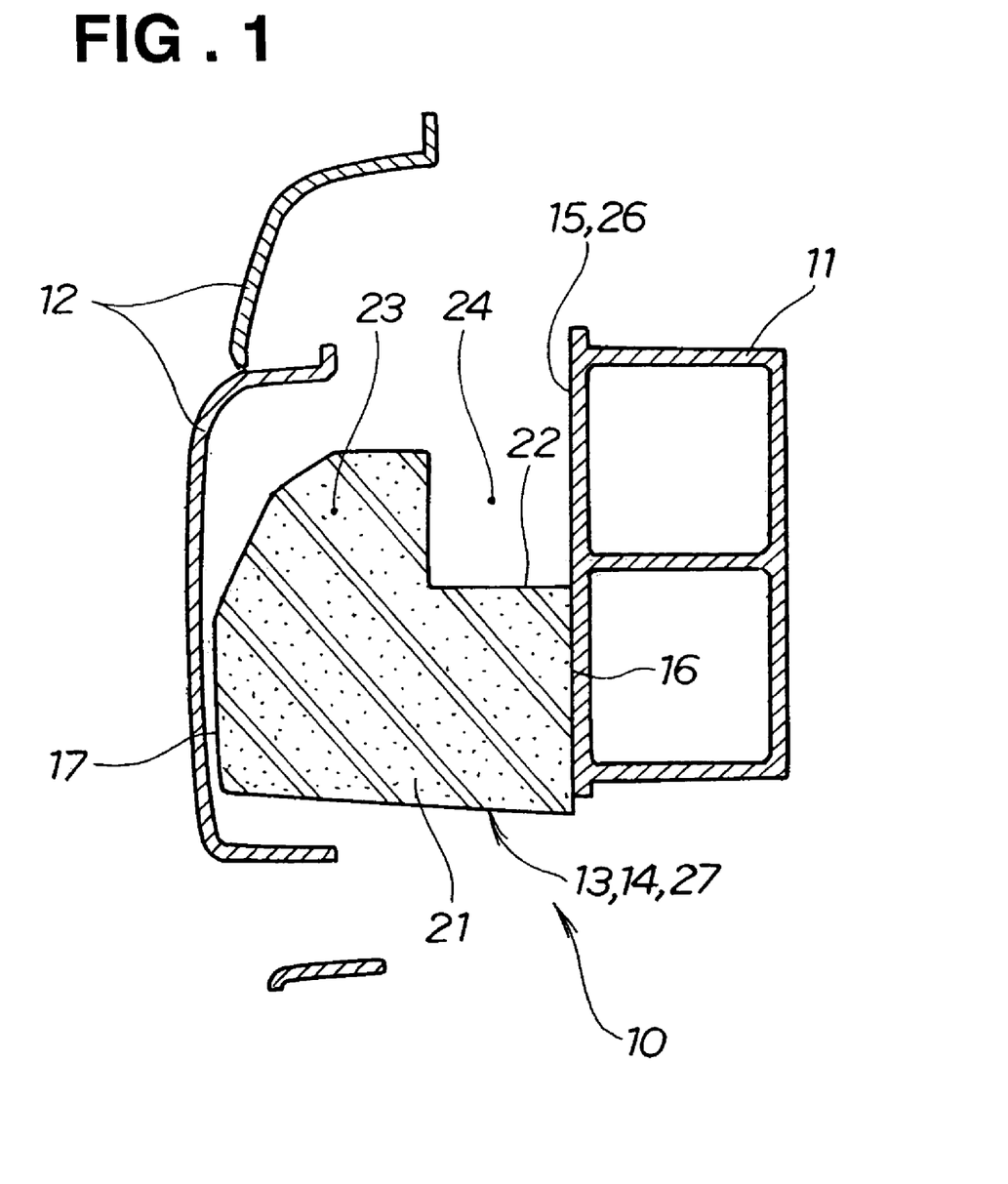
FIG. 1 is a cross-sectional view of a vehicle bumper according to an embodiment of the present invention.

A vehicle bumper 10 according to the present invention shown in FIG. 1 includes a bumper beam 11, a bumper face 12 constituting the front end of a vehicle, and an energy-absorbing member 13 interposed therebetween. The energy-absorbing member 13 is made from a foam material 14.

A front surface 15 of the bumper beam 11 abuts a rear surface 16 of the energy-absorbing member 13. A front surface 17 of the energy-absorbing member 13 is opposite to the bumper face 12.

The energy-absorbing member 13 includes a body 21 and a head 23 extending upward from an upper surface 22 of the body 21, and is an L-shaped cross-section member formed to provide a space 24 between the head 23 and the front surface 15 of the bumper beam 11. The energy-absorbing member 13 further includes a straight central portion 25 and rearwardly retreating end portions 36 disposed at each end of the straight central portion 25.

More specifically, the vehicle bumper 10 in the present invention includes the bumper beam 11 supporting the bumper, the bumper face 12 as an important element for the appearance of the vehicle, covering the front surface 15 of the bumper beam 11, and the energy-absorbing member 13 interposed therebetween. The bumper beam 11 has a flat vertical surface 26 at least at the front surface 15. The energy-absorbing member 13 is made from the foam material 14, and is an L-shaped cross-section member 27 including the body 21 extended from the vertical surface 26 toward the bumper face 12, and the head 23 extended upward from the upper surface 22 of the body 21. This configuration has the space 24 provided between the head 23 of the energy-absorbing member 13 and the front surface 15 of the bumper beam 11.

Next, with reference to FIGS. 2, 3 and 4, the mounting structure of the energy-absorbing member 13 will be described.

Figure 2:
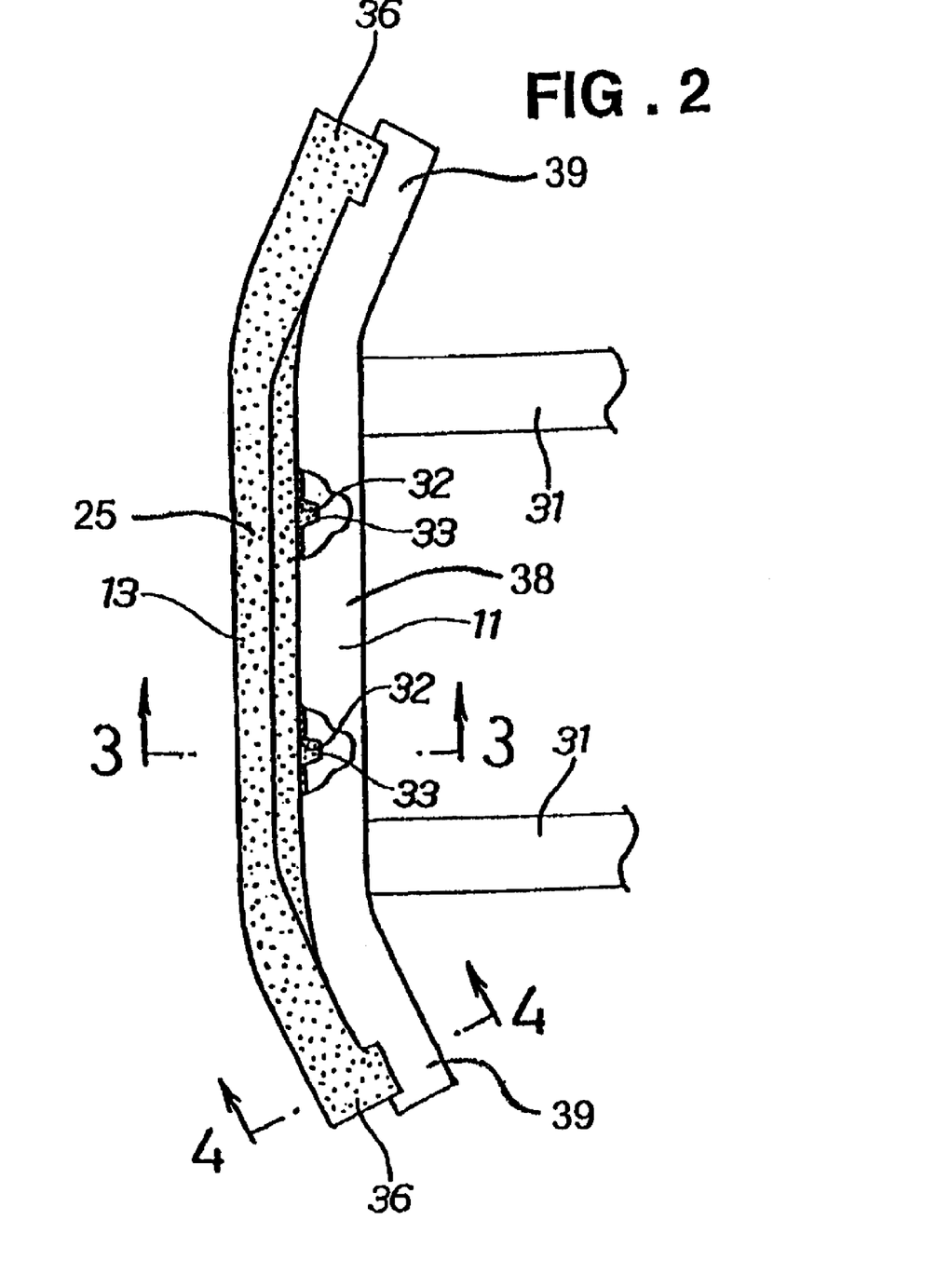
FIG. 2 is a plan view of the vehicle bumper according to the present invention.

As shown in FIG. 2, the bumper beam 11 is attached to right and left front side members 31, 31 extending longitudinally of the vehicle, so as to extend transversely. The energy-absorbing member 13 is attached to the front surface 15 of the bumper beam 11.

Figure 3:
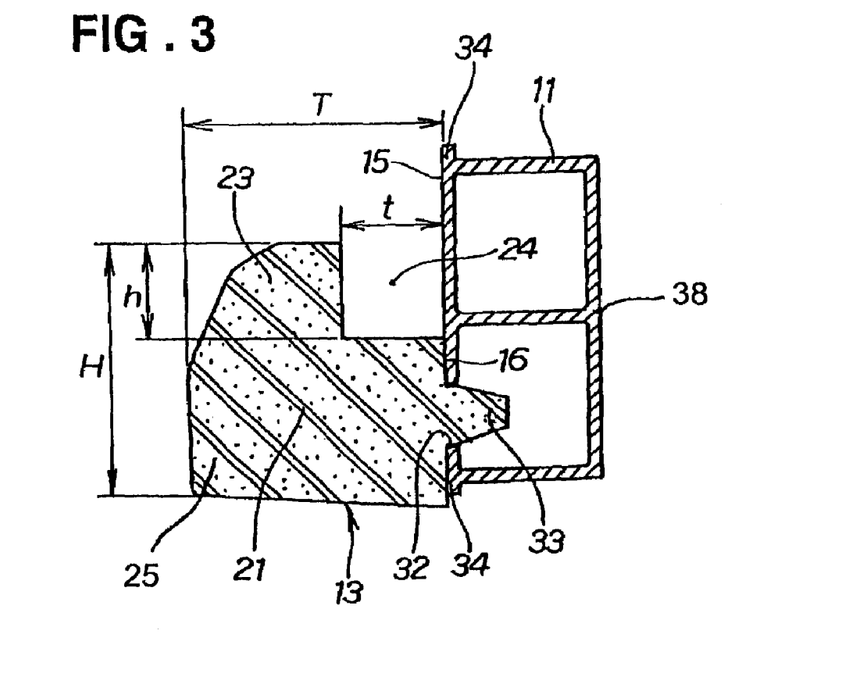
FIG. 3 is a cross-sectional view along line 3—3 of FIG. 2.

The bumper beam 11 shown in FIGS. 2 and 3 is an aluminum extrusion and includes a straight central portion 38 and rearwardly retreating end portions 39 disposed at each end of the straight central portion 38. Two mating holes 32 are formed in the front surface 15 in the straight central portion 38 of the bumper beam 11 in a transverse direction.

Two protrusions 33 protruding rearward are formed on the rear surface 16 of the energy-absorbing member 13. The protrusions 33 are fitted into the mating holes 32. Thus, the energy-absorbing member 13 is positioned by the the two protrusions 33, 33.

Figure 4:
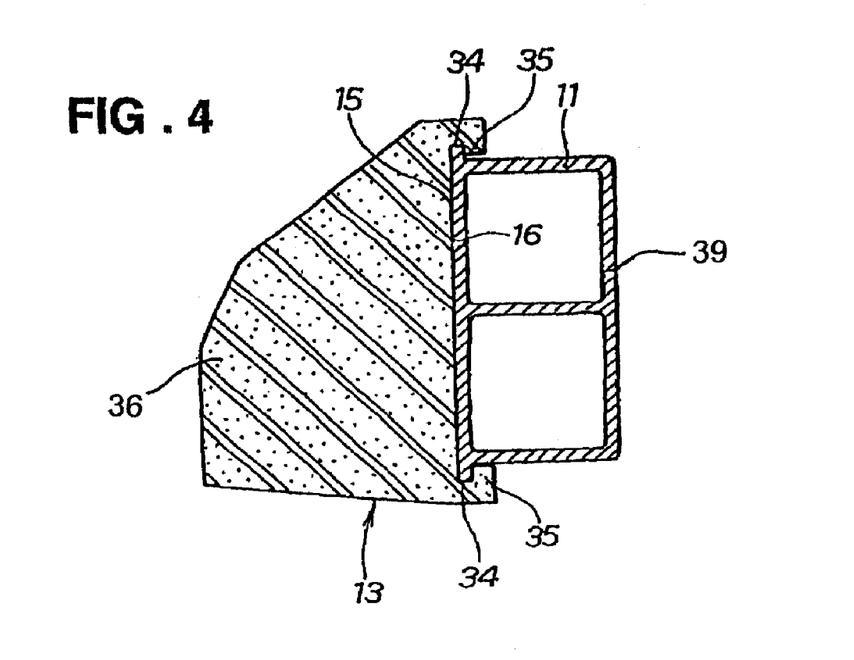
FIG. 4 is a cross-sectional view along line 4—4 of FIG. 2.

As shown in FIG. 4, the bumper beam 11 has flanges 34, 34 at the top and bottom of the front surface 15. The end portions 36 of the energy-absorbing member 13 have upper and lower hooks 35, 35 to engage the flanges 34, 34. Thus, the upper and lower hooks 35, 35 formed at laterally opposite ends 36 of the energy-absorbing member 13 facilitate in securing the energy-absorbent member 13 to the bumper beam 11. The end portions 36 of the energy-absorbing member 13 are enlarged, as compared to the central portion 25, such that the end portions 36 overlie the front surface 15 of the bumper beam end portions 39 in a face-to-face manner. Accordingly, the end portions 36 are shaped differently from the center portion 25 in that no gap or space is provided between the energy-absorbing member end portions 36 and the bumper beam end portions 39, as illustrated in FIGS. 2 and 4.

Figure 5A:
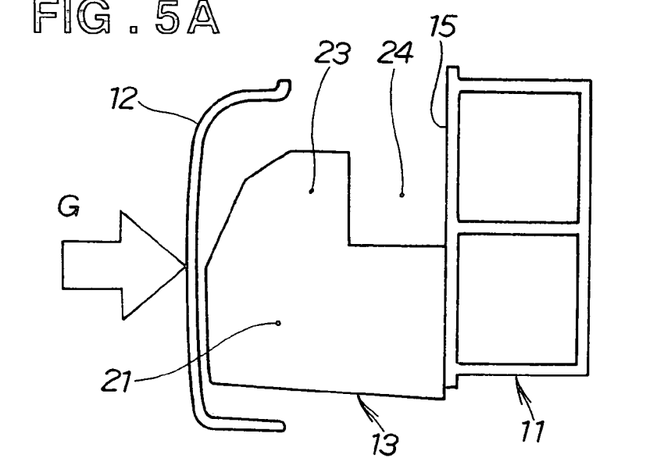
FIGS. 5A to 5C are diagrams illustrating a state of deformation of an energy-absorbing member when a load is applied to the vehicle bumper.
Figure 5B:
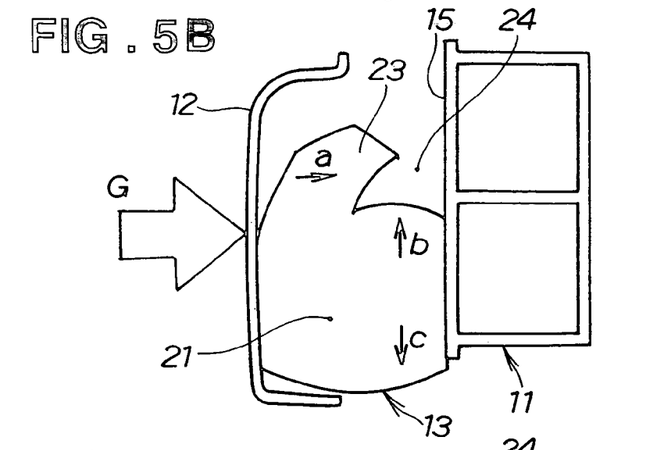
Figure 5C:
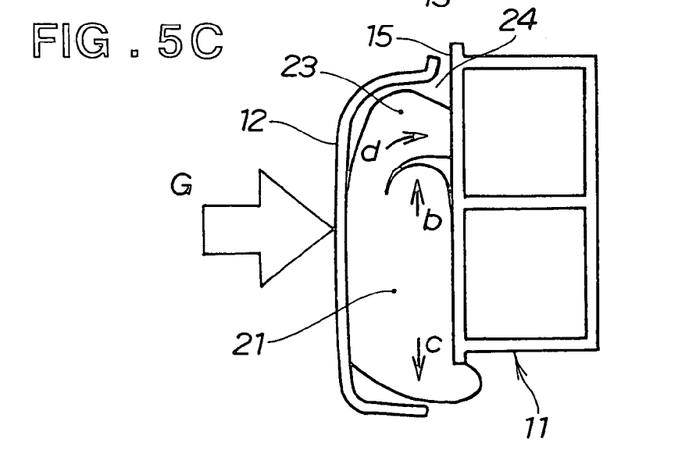

FIGS. 5A, 5B and 5C show a state of deformation of the energy-absorbing member 13 when the bumper 10 is subjected to a load.

FIG. 5A shows a state immediately before the bumper 10 is subjected to a load G. In this state, no deformation occurs in the energy-absorbing member 13.

FIG. 5B shows a state where the bumper 10 is subjected to a load G, and deformation occurs in the energy-absorbing member 13. The head 23 of the energy-absorbing member 13 strikes a pedestrian's leg; the head 23 is deformed in the direction of arrow a; and the body 21 is deformed vertically as shown by arrows b and c.

The head 23 protruding upward from the upper surface 22 of the body 21 of the energy-absorbing member 13 is provided so as to increase the volume of the head 23 which is the first to strike a pedestrian's leg. The increase in volume of the head 23 leads to a reduction in low-load area in the initial stages of a collision, and an increase in energy-absorption efficiency.

With the increased energy-absorption efficiency in the initial stages of a collision, an impact can be kept lower than or equal to a predetermined load G, and a limited deformation stroke can provide required impact-absorption performance.

FIG. 5C shows a state where the bumper 10 is subjected to the load G, and the energy-absorbing member 13 is further deformed. The body 21 of the energy-absorbing member 13 is further deformed vertically, and the head 23 is bent into the space 24.

Figure 6:
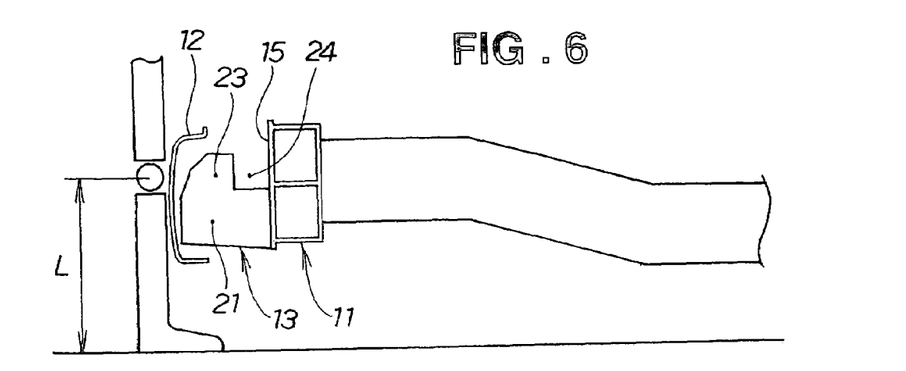
FIG. 6 is a diagram illustrating a method of measuring load characteristics of the vehicle bumper.

FIG. 6 shows a method of measuring the bumper load characteristics. The load measurement method evaluates the energy-absorption capacity and load characteristics in the event of a collision with a pedestrian, with a person having a knee of the height of L mm above the ground as a standard.

This method is a self-imposed test in the automotive industry called EEVC WG test. The value of L is 494 mm. The height of the space 24 included in the bumper 10 in this embodiment is substantially identical to the knee height.

Preferable load characteristics should be such that an initial load is not too large; a rapid increase in the load due to bottom-hitting or the like does not occur; and the greater the absorbed impact energy becomes, the better.

Next, description will be made as to the results of an experiment on a relationship between the load and the deformation stroke in energy-absorbing members in comparative examples 1 and 2 and in the energy-absorbing member 13 in this embodiment.

Figure 7A:
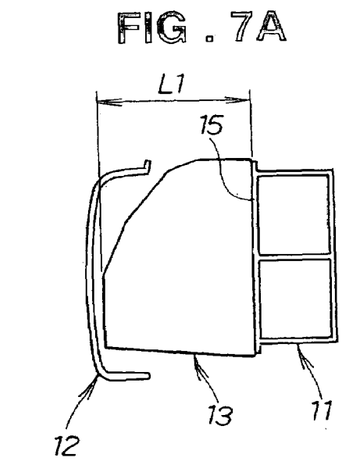
FIGS. 7A and 7B are diagrams illustrating a vehicle bumper structure in comparative example 1 and experimental results on a load and a deformation stroke.
Figure 7B:
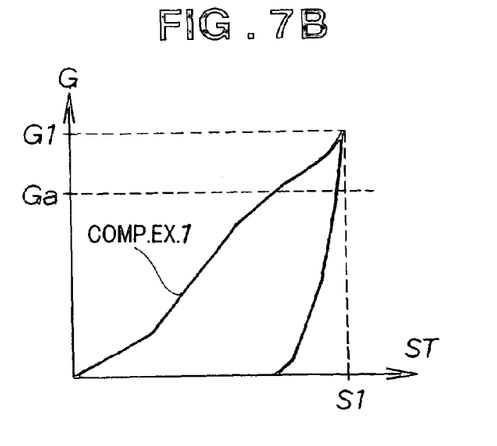

FIG. 7A is a cross-sectional view of a bumper in the comparative example 1; FIG. 7B shows the load characteristics of the structure of the comparative example 1. The horizontal axis of the load characteristics represents the stroke ST, and the vertical axis represents the load G.

An energy-absorbing member 13 in the comparative example 1 shown in FIG. 7A has a simple shape with a protruding portion oriented toward a bumper face 12. The energy-absorbing member 13 has a length of L1 in a longitudinal direction.

As shown in FIG. 7B, as the stroke increases, the load G increases, and a bottom-hitting load G1 is caused by a shortage of space through which a foam material travels between a bumper beam 11 and the bumper face 12. The bottom-hitting load G1 is a load exceeding an allowable load Ga for the protection of a leg, and is unfavorable in terms of protection of a leg.

Figure 8A:
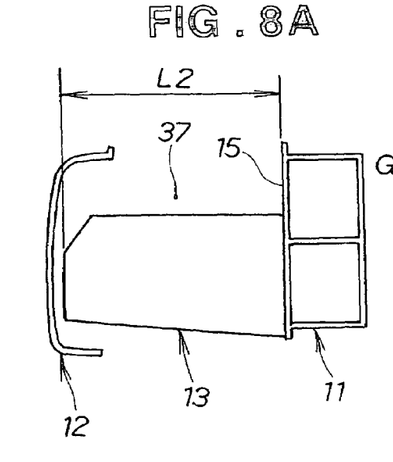
FIGS. 8A and 8B are diagrams illustrating a vehicle bumper structure in comparative example 2 and experimental results on a load and a deformation stroke.
Figure 8B:
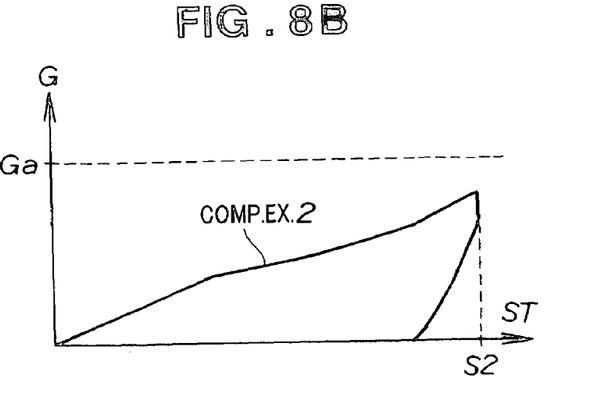

FIG. 8A is a cross-sectional view of a bumper in the comparative example 2; FIG. 8B shows the load characteristics of the structure of the comparative example 2.

An energy-absorbing member 13 in the comparative example 2 shown in FIG. 8A has a simple shape with a protruding portion oriented toward a bumper face 12. To ensure sufficient impact energy absorption, the energy-absorbing member 13 of the comparative example 2 has a length of L2 (L1<L2).

As shown in FIG. 8B, as the stroke increases, the load G increases, but a rapid increase in the load due to bottom-hitting is unlikely to occur because a space 37 for a foam material to escape is provided between a bumper beam 11 and the bumper face 12.

However, the stroke ST reaches S2 (S1<S2), which is favorable for absorption of impact energy, but increases the longitudinal length of the vehicle, leaving a problem in the appearance of the vehicle or the like.

Figures 9A, 9B, 10:
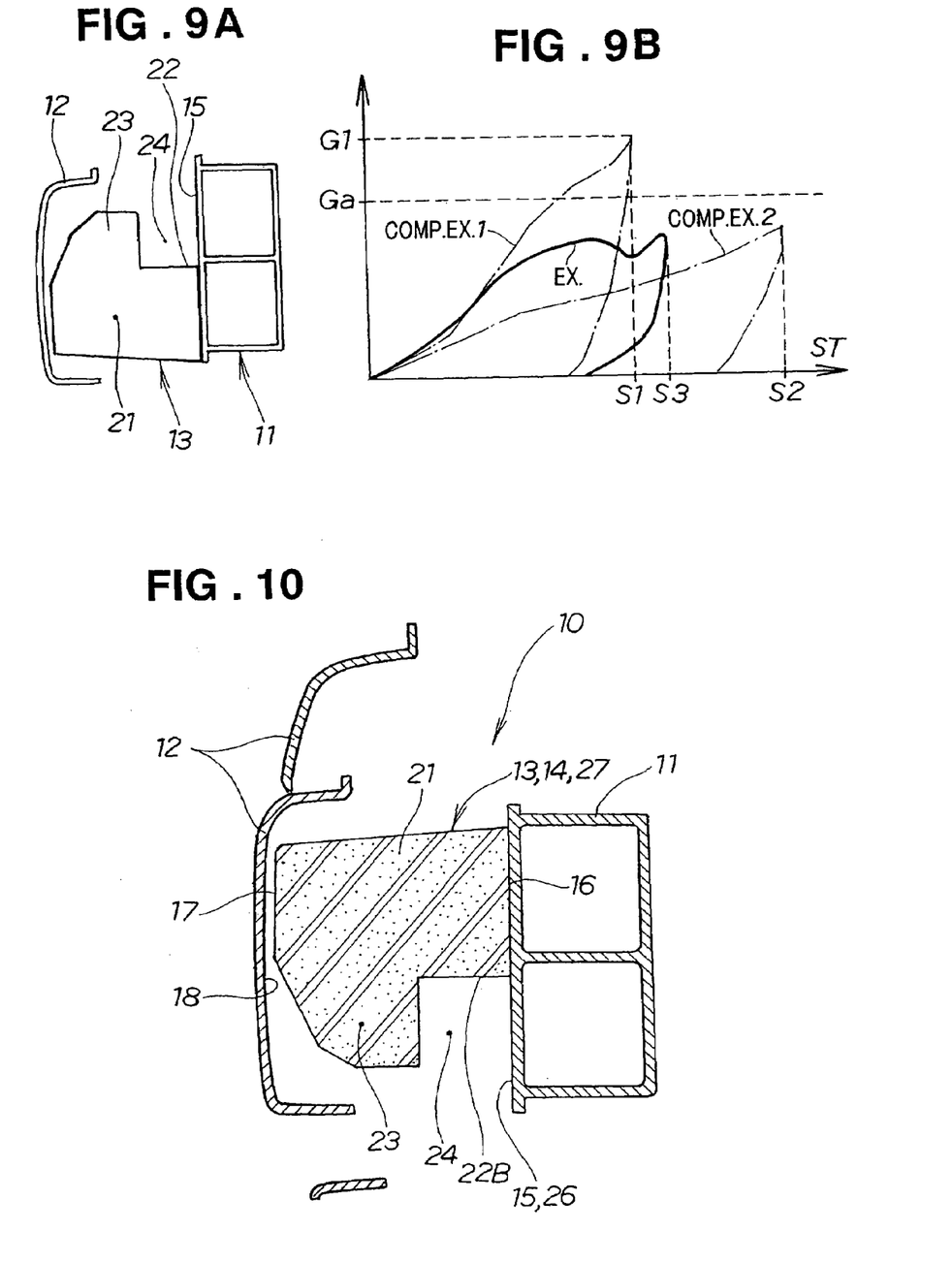
FIG. 9A shows the vehicle bumper in this embodiment.
FIG. 9B is a graph of comparison between the embodiment and the comparative examples 1 and 2.
FIG. 10 is a cross-sectional view of an embodiment different from the embodiment shown in FIG. 1.

FIG. 9A is a cross-sectional view of the bumper 10 in this embodiment; FIG. 9B is a graph showing the load characteristics in the above-described comparative examples 1 and 2 and in this embodiment in comparison.

As shown in FIG. 9A, the energy-absorbing member 13 in this embodiment includes the head 23 raised from the front part of the body 21, providing the space 24 between the head 23 and the front surface 15 of the bumper beam 11.

Referring to FIG. 9B, as the stroke increases, the load G increases. The formation of the head 23 and the space 24 allows the head 23 to move to the space 24 as the load G increases, thereby reducing non-collapsing portions of the energy-absorbing member 13, preventing occurrence of bottom-hitting, and providing efficient absorption of impact energy.

That is, the provision of the head 23 extended upward from the upper surface 22 of the body 21 of the energy-absorbing member 13 can provide a load allowable for the protection of a leg in the initial stages of a collision.

Also, the provision of the space 24 between the head 23 and the front surface 15 of the bumper beam 11 prevents a rapid increase in the load caused by non-collapsing portions of the energy-absorbing member 13, or the bumper face 12 striking the bumper beam 11 due to deformation of the energy-absorbing member 13 upon a collision, which is called bottom-hitting.

In addition, the provision of the space 24 rearward of the head 23 allows a sufficient impact-absorbing stroke of the bumper 10, providing favorable load characteristics.

Accordingly, throughout the head 23 of the bumper 10, a load allowable for the protection of a leg in the initial stages of a collision can be obtained, and also favorable load characteristics can be obtained.

With reference returned to FIG. 3, the length t of the space 24 and the height h of the head 23 will be described.

The length t of the space 24 is preferably 20% to 40% of the length T of the energy-absorbing member 13 in a longitudinal direction.

If it is smaller than 20%, bottom-hitting will occur, and an initial load a leg will suffer at the beginning of a collision will be too large to sufficiently reduce the degree of injury to the leg.

Conversely, if it is greater than 40%, while the energy-absorbing stroke can be greater, it is necessary to provide a given length of T to ensure sufficient impact energy absorption, and can adversely affect the appearance of the vehicle.

Therefore, the length t of the space 24 is preferably 20% to 40% of the length T of the energy-absorbing member 13.

The height h of the head 23 is preferably 30% to 50% of the vertical length H of the energy-absorbing member 13.

If it is smaller than 30%, bottom-hitting will occur, and an initial load a leg will suffer at the beginning of a collision will be too large to sufficiently reduce the degree of injury to the leg.

Conversely, if it is greater than 50%, while the energy-absorbing stroke can be increased, it is necessary to provide a given length of H to ensure sufficient impact energy absorption, and can adversely affect the appearance of the vehicle.

Therefore, the height h of the head 23 is preferably 30% to 50% of the vertical length H of the energy-absorbing member 13.

FIG. 10 is an embodiment different from the embodiment shown in FIG. 1. The reference numerals in FIG. 1 are used for description. An energy-absorbing member 13 is provided with a body 21 extended from a vertical surface 26 constituting a front surface 15 of a bumper beam 11 toward a bumper face 12, and a head 23 extended downward from a front lower surface 22B of the body 21. A space 24 is provided between the head 23 of the energy-absorbing member 13 and the front surface 15 of the bumper beam 11.

In the vehicle bumper 10 of this invention, the bumper beam 11 may not necessarily be an aluminum extrusion. It may be a press-molded product of a thin steel plate or an aluminum plate. The energy-absorbing member 13 may be fixed to the bumper beam 11 in any appropriate manner. For example, it may be fastening by fastening means such as bolts and nuts, or adhesion by adhesive means such as an epoxy adhesive.

Obviously, various minor changes and modifications of the present invention are possible in the light of the above teaching. It is therefore to be understood that within the scope of the appended claims the invention may be practiced otherwise than as specifically described.

What is claimed is:

1. A vehicle bumper comprising:
   a bumper beam extending transversely of a vehicle;
   a bumper face covering a front surface of the bumper beam; and
   an energy-absorbing member interposed between said bumper beam and said bumper face,
   wherein;
   the bumper beam includes a flat vertical surface at least at a front surface thereof,
   the energy-absorbing member is made from a foam material and has an L-shaped cross-section including a body extending from the vertical surface toward the bumper face and a head extending vertically from one of a front upper surface or a front lower surface of the body, said energy absorbing member head and said bumper beam front surface are disposed a distance from one another so as to define a space therebetween, and wherein, when the bumper is subjected to a load, the head and the body of the energy absorbing member are compressed toward the bumper beam and deform into the space.

2. The bumper as set forth in claim 1, wherein the bumper beam is an aluminum extrusion, and has holes formed therein at a straight central portion thereof in a transverse direction, and the energy-absorbing member includes protrusions that are adapted to fit into the holes, wherein a top of the front surface of the bumper beam includes a upper flange and a bottom of the front surface of the bumper beam includes a lower flange, and wherein rearwardly retreating end portions of the energy-absorbing member include upper and lower hooks to engage the upper and lower flanges of the bumper beam.

3. The bumper as set forth in claim 1, wherein the energy absorbing member head has a first maximum vertical dimension and the energy absorbing member has a second maximum vertical dimension, and wherein the first maximum vertical dimension is between about 30% to 50% of the second maximum vertical dimension.

4. The bumper as set forth in claim 1, wherein the energy absorbing member head has a first length dimension and the space between the energy absorbing member head and the bumper beam front surface has second length dimension, and wherein the second length dimension is between about 20% to 40% of the first length dimension.

5. The bumper as set forth in claim 2, wherein the energy absorbing energy absorbing member head has a first maximum vertical dimension and the energy absorbing member has a second maximum vertical dimension, and wherein the first maximum vertical dimension is between about 30% to 50% of the second maximum vertical dimension.

6. The bumper as set forth in claim 2, wherein the energy absorbing member head has a first length dimension and the space between the energy absorbing member head and the bumper beam front surface has a second length dimension, and wherein the second length dimension is between about 20% to 40% of the first length dimension.

7. The bumper as set forth in claim 5, wherein the energy absorbing member head has a first length dimension and the space between the energy absorbing member head and the bumper beam front surface has a second length dimension, and wherein the second length dimension is between about 20% to 40% of the first length dimension.

8. The bumper set forth in claim 1, wherein the bumper beam includes a straight central portion and rearwardly retreating end portions disposed at each end of the straight central portion, wherein the energy-absorbing member includes a straight central portion and rearwardly retreating end portions disposed at each end of the straight central portion, and wherein the energy-absorbing member central portion has the L-shaped cross section while the rearwardly retreating end portions of the energy-absorbent member are enlarged relative to the central portion such that the end portions of the energy-absorbent member overlie the front surface of the bumper beam end portions in a face-to-face manner.

* * * * *

UNITED STATES PATENT AND TRADEMARK OFFICE
CERTIFICATE OF CORRECTION

PATENT NO.       : 7,201,412 B2
APPLICATION NO. : 11/191860
DATED            : April 10, 2007
INVENTOR(S)      : Kashiwagi et al.

It is certified that error appears in the above-identified patent and that said Letters Patent is hereby corrected as shown below:

Column 7, Line 16, (Claim 2, Line 6), delete "a" and insert --an--.

Column 7, Line 31, (Claim 4, Line 4), after "has" insert --a--.

Column 8, Line 2, (Claim 5, Line 2), after "absorbing" (first occurance), delete "energy absorbing".

Signed and Sealed this

Fifteenth Day of May, 2007

JON W. DUDAS
*Director of the United States Patent and Trademark Office*